US006292801B1

(12) United States Patent
Campbell et al.

(10) Patent No.: US 6,292,801 B1
(45) Date of Patent: Sep. 18, 2001

(54) SYSTEM AND METHOD FOR MANAGING COMPUTER AND PHONE NETWORK RESOURCES

(76) Inventors: Rene L. Campbell, 1005 Lake Ridge La., Dunwoody, GA (US) 30338; Morten S. Jensen, 1102 Anemone Way, Acworth, GA (US) 30102; Kent H. Jones, 3250 Running Cedar, Marietta, GA (US) 30062; Richard L. Mauro, 346 Lands Mill, Marietta, GA (US) 30067; John P. O'Reilly, 5300 Linnadine Way, Norcross, GA (US) 30092; Raphael D. McAbee-Reher, 4200 Providence Sq., Alpharetta, GA (US) 30004; Dean D. Rau, 445 Huntcliff Green, Atlanta, GA (US) 30350

( * ) Notice: Subject to any disclaimer, the term of this patent is extended or adjusted under 35 U.S.C. 154(b) by 0 days.

(21) Appl. No.: 09/410,114
(22) Filed: Sep. 30, 1999

Related U.S. Application Data
(60) Provisional application No. 60/102,825, filed on Oct. 2, 1998.

(51) Int. Cl.$^7$ .................................................. G06F 17/30
(52) U.S. Cl. .............................. 707/10; 707/5; 707/523; 704/10; 709/228; 370/338; 370/349; 434/350
(58) Field of Search ............................ 704/9, 10; 707/5, 707/10, 200, 523; 379/115, 112; 709/228; 370/338, 349; 434/350

(56) References Cited

U.S. PATENT DOCUMENTS

| | | | |
|---|---|---|---|
| 4,805,134 | * | 2/1989 | Calo et al. ............................ 707/10 |
| 5,231,593 | | 7/1993 | Notess .................................. 702/180 |

(List continued on next page.)

FOREIGN PATENT DOCUMENTS 0 743 778 A3    5/1996  (EP) .

(List continued on next page.)

OTHER PUBLICATIONS

Cheriton, David et al., "Network Measurement of the VMTP Request–Response Protocol in the V Distributed System", Proceedings of the ACM Conference on Measurement and Modeling of Computer Systems, May 11–14, 1987, pp. 216–225.*

(List continued on next page.)

Primary Examiner—Hosain T. Alam
Assistant Examiner—Shahid Alam
(74) Attorney, Agent, or Firm—Morris, Manning & Martin, LLP

(57) ABSTRACT

A system tracks ownership data for data resources coupled on a network. The system includes a data extractor for extracting data resource communication activity data from a plurality of network activity data sources, a database of organizational data resource ownership data, and a communication activity report generator for correlating extracted data resource communication activity data and organizational data resource ownership data so that ownership of communication activity may be tracked. The data extractor obtains network activity data from a variety of data sources such as firewalls, routers, servers, and PBXs. Network activity data about communication activity may be obtained directly from the data resources initiating the communication activity or from data sources that handle communication activity initiated by a data resource. The network activity data are then processed to extract data resource communication activity data. Organizational data resource ownership data includes data for identifying the data resources from which communication activity data are extracted and the organizational entities owning the data resources. Typically, these organizational entities include company data, division data, department data, and owner data. This data may then be linked to identify an owner as being associated with a particular department and division within a company. The communication activity report generator may be used to generate a response to a directory query or a history query. A response to a directory query identifies one or more data resources and the ownership data linked to that device. A response to a history query identifies for a particular time period, one or more data resources, the network activity initiated by those data resources and ownership data linked to those data resources.

22 Claims, 16 Drawing Sheets

U.S. PATENT DOCUMENTS

| | | | |
|---|---|---|---|
| 5,243,543 | | 9/1993 | Notess .................................. 709/224 |
| 5,251,152 | | 10/1993 | Notess .................................. 709/224 |
| 5,438,508 | * | 8/1995 | Wynam ..................................... 705/8 |
| 5,592,620 | | 1/1997 | Chen et al. .......................... 709/223 |
| 5,594,740 | * | 1/1997 | LaDue .................................. 455/410 |
| 5,606,600 | | 2/1997 | Elliott et al. ........................ 379/112 |
| 5,610,915 | * | 3/1997 | Elliott et al. ........................ 370/259 |
| 5,623,540 | | 4/1997 | Morrison et al. .................... 379/115 |
| 5,657,317 | * | 8/1997 | Mahony et al. .................... 370/338 |
| 5,696,903 | * | 12/1997 | Mahany .............................. 709/228 |
| 5,726,984 | * | 3/1998 | Kubler et al. ........................ 370/349 |
| 5,727,950 | * | 3/1998 | Cook et al. .......................... 434/350 |
| 5,740,233 | * | 4/1998 | Cave et al. .......................... 379/113 |
| 5,768,352 | | 6/1998 | Elliott et al. ........................ 379/112 |
| 5,768,578 | * | 6/1998 | Kirk et al. ........................... 707/100 |
| 5,790,536 | * | 8/1998 | Mahany et al. ..................... 370/338 |
| 5,894,509 | | 4/1999 | Kasprzyk et al. ................... 379/112 |
| 5,987,611 | * | 11/1999 | Freund ................................. 713/201 |
| 5,991,713 | * | 11/1999 | Unger et al. ............................ 704/9 |
| 6,029,182 | * | 2/2000 | Nehab et al. ........................ 707/523 |
| 6,065,055 | * | 5/2000 | Hughes et al. ...................... 709/229 |
| 6,078,924 | * | 6/2000 | Ainsbury et al. .................... 707/101 |
| 6,088,698 | * | 7/2000 | Lipkin ................................... 707/10 |
| 6,105,028 | * | 8/2000 | Sullivan et al. ...................... 707/10 |
| 6,108,662 | * | 8/2000 | Hoskins et al. ...................... 707/102 |
| 6,112,238 | | 8/2000 | Boyd et al. .......................... 709/224 |
| 6,157,836 | * | 12/2000 | Cashman .............................. 455/436 |
| 6,201,948 | * | 3/2001 | Cook et al. .......................... 434/350 |

FOREIGN PATENT DOCUMENTS

| | | | |
|---|---|---|---|
| 0743778 A2 | * | 11/1996 | (EP) ..................................... 379/115 |
| WO 94/23543 | | 10/1994 | (WO) . |
| WO 96/24899 | | 8/1996 | (WO) . |

OTHER PUBLICATIONS

Awerbuch, Baruch et al., "Online Tracking of Mobile Users", Journal of the Association for Computing Machinery, vol. 42, No. 5, Sep. 1995, pp. 1021–1058.*

International Search Report, Feb. 10, 2000, PCT/US99/22783 (Corresponding PCT Application).

* cited by examiner

PBX - CALL DETAIL RECORD OUTPUT

| Date | Ring/StartTime | Duration | Ext. | Dialed Number | | Trunk | |
|---|---|---|---|---|---|---|---|
| 990602 09444905/07 | 18:59 18:54 | 0:02:15 | 3897 | 1818-891-3392 | 9 | 0021 | 127 |
| 990602 09444905/07 | 19:05 19:02 | 0:00:35 | 4971 | 1888-878-0940 | 9 | 0014 | 127 |
| 990602 09444905/07 | 19:05 19:01 | 0:01:07 | 4909 | 418-0922 | 9 | 0013 | 127 |

FIG. 3A

PROXY SERVER - LOG OUTPUT - VERSION 1.0

Originating IP   UserID   Fwall   Session   Start date/time   Site Name
206.241.52.32, rmoon, -, Y,   9/30/97,   17:51:52, 1, -, -, igate.micros.com, -
                                                           Protocol
,       80,      14471,          513,      1286,  http,   tcp,
 URL
-, http://search.shareware.com/SWImages/bugs/star2.gif, -, Upstream, 64, 0

206.241.52.32, rmoon, -, Y,   9/30/97,   17:51:52, 1, -, -, igate.micros.com, -
, 80, 14491, 510, 1281, http, tcp, -, http://search.shareware.com/SWImages/
r-guide.gif, -, Upstream, 64, 0

206.241.52.32, rmoon, -, Y,   9/30/97,   17:51:59, 1, -, -, igate.micros.com, -
, 80, 12558, 766645, 766921, http, -, -, ftp://mirrors.aol.com/pub/cica/pc/
win95/desktop/ywinlogo.zip, -, Upstream, 200, 0

FIG. 3B

PROXY SERVER - LOG OUTPUT - VERSION 2.0

192.168.2.5, anonymous, Mozilla/2.0, (compatible; MSIE 3.02; Update a;
Windows 95), N, 9/17/97, 10:39:23, W3Proxy, FIRE1, -, www.telemate.com,
199.170.121.232, 80, 150, 605, 1031, http, tcp, GET, http://
www.telemate.com/remote.html, -, Inet, 304, 0

192.168.2.5, anonymous, Mozilla/2.0, (compatible; MSIE 3.02; Update a;
Windows 95), N, 9/17/97, 10:39:23, W3Proxy, FIRE1, -, www.telemate.com, -,
80, 180, 604, 1029, http, tcp, GET, http://www.telemate.com/main2.html, -,
Inet, 304, 0

192.168.2.5, anonymous, Mozilla/2.0, (compatible; MSIE 3.02; Update a;
Windows 95), N, 9/17/97, 10:39:23, W3Proxy, FIRE1, -, www.telemate.com,
199.170.121.232, 80, 140, 628, 1077, http, tcp, GET, http://
www.telemate.com/backgrnd.gif, -, Inet, 304, 0

FIG. 3C

SAMPLE PROCESSED OUTPUT

| Data Source | Resource | Resource Type | Date/Time | Duration | Direction | Destination | Location | Trunk/Protocol |
|---|---|---|---|---|---|---|---|---|
| PBX | 3897 | Extension | 05071999191905 | 135 | Out | 18188913392 | GlendateCA | 0021 |
| PBX | 4971 | Extension | 05071999191905 | 35 | Out | 18888780940 | Toll | 0014 |
| PBX | 4909 | Extension | 05071999191905 | 67 | Out | 4180922 | Local | 0013 |
| MSP | 206.241.52.32 | IP | 09301997171751 | 14471 | Out | http://sea.search.shareware.com | | http |
| MSP | 206.241.52.32 | IP | 09301997171751 | 14491 | Out | http://sea.search.shareware.com | | http |
| MSP | 206.241.52.32 | IP | 09301997171751 | 12558 | Out | http://sea.mirrors.aol.com | | http |

FIG. 4

CompanyDivision Table:

| Column | Data Type | Description |
|---|---|---|
| ID_CompanyDivision | Int/Identity | Identity |
| ID_Company | Int | Foreign Key |
| ID_Division | Int | Foreign Key |
| StartDate | DateTime | Starting date |
| EndDate | DateTime | Ending date |

DepartmentOwner Table:

| Column | Data Type | Description |
|---|---|---|
| ID_DepartmentOwner | Int/Identity | Identity |
| ID_Department | Int | Foreign Key |
| ID_Owner | Int | Foreign Key |
| StartDate | DateTime | Starting date |
| EndDate | DateTime | Ending date |

DivisionDepartment Table:

| Column | Data Type | Description |
|---|---|---|
| ID_DivisionDepartment | Int/Identity | Identity |
| ID_Division | Int | Foreign Key |
| ID_Department | Int | Foreign Key |
| StartDate | DateTime | Starting date |
| EndDate | DateTime | Ending date |

OwnerResource Table:

| Column | Data Type | Description |
|---|---|---|
| ID_OwnerResource | Int/Identity | Identity |
| ID_Owner | Int | Foreign Key |
| ID_Resource | Int | Foreign Key |
| StartDate | DateTime | Starting date |
| EndDate | DateTime | Ending date |

FIG. 7

·Department Owner Join

| DEPARTMENT | OWNER | START DATE | END DATE |
|---|---|---|---|
| Sales | Richard Moon | 01/02/1993 | 09/14/1995 |
| Marketing | Richard Moon | 09/15/1995 | Open |

·Owner Resource Join

| OWNER | RESOURCE | START DATE | END DATE |
|---|---|---|---|
| Richard Moon | 206.241.52.32 | 01/02/1993 | Open |
| Richard Moon | 3897 | 01/02/1993 | 09/14/1995 |
| Richard Moon | 4780 | 09/15/1995 | Open |

FIG. 8

| ID Company | ID Division | ID Department | ID Owner | ID Resource | StartDate | EndDate |
|---|---|---|---|---|---|---|
| Company | Division | Sales | Richard Moon | 206.241.52.32 | 01/02/1993 | 09/14/1995 |
| Company | Division | Sales | Richard Moon | 3897 | 01/02/1993 | 09/14/1995 |
| Company | Division | Marketing | Richard Moon | 206.241.52.32 | 09/15/1993 | open |
| Company | Division | Marketing | Richard Moon | 4780 | 09/15/1993 | open |

FIG. 12

SYSTEM AND METHOD FOR MANAGING COMPUTER AND PHONE NETWORK RESOURCES

CROSS-REFERENCE TO RELATED APPLICATIONS

This application claims the benefit of U.S. Provisional Application Serial No. 60/102,825 which was filed on Oct. 2, 1998.

FIELD OF THE INVENTION

This invention relates to device usage reporting systems, and more particularly, to systems for reporting usage of devices coupled to a computer network.

BACKGROUND OF THE INVENTION

A communication network for an organization is typically comprised of network devices coupled together through a computer network and a PBX switch, telephones, and other voice devices coupled together in a telephone network. Network devices such as firewalls, proxy servers, and web servers, along with some voice devices such as PBXs generate logs representing inbound and outbound computer and telephone network activity, respectively. Within the organization, telephone system managers review voice device generated log reports regarding telephone usage and network administrators use network device generated log reports regarding computer network resource utilization. As a result, system managers and network administrators focus on only a portion of an organization's communication network without knowledge of all of the communication network issues that exist for an organization.

In many organizations abuse and misuse of communication devices cause significant productivity loss. In addition, more mundane tasks such as traffic management, costs allocation, operating efficiency, and disaster avoidance are often overlooked by system managers or network administrators as they handle the surge of issues and problems that arise daily. As communication technology continues to converge, the telephone system manager and network administrator functions also converge. This is particularly the case in organizations that use computer integrated telephony. Computer integrated telephony couples the telephone network to the computer network within an organization to provide data files to desktop computers in conjunction with telephone calls arriving at an associated handset or to permit the exchange of messages between voicemail systems and email systems.

In organizations where the network communication network and the telephone communication network are separated, vigilance regarding the efficient utilization of the company's communication resources is difficult. For example, employees that abuse telephone privileges, especially long distance services, are frequently the same employees who use Internet access to obtain files that are not work related. A computer network manager may become aware of abuse from a network activity monitoring system that tracks Internet access or other computer network activities associated with an employee's computer user identifier. However, the telephone network manager does not have data that correlates the user identifier to any devices on the telephone network. Thus, abusive activity on one network is not readily available for detecting abusive activity on the other network. If information regarding the usage of communication resources for an organization were more integrated, abusive activities on one communication network might lead to the discovery of abuses on another communication network for the organization.

When employees are transferred within an organization, an employee is frequently assigned a new telephone extension and a new computer. When this occurs, both the computer network manager and telephone system manager must separately update their respective records to identify the change in ownership of devices on a network. Such changes include the reassignment of the employee's old telephone extension number and computer user identifier as well as the assignment of a new telephone extension and/or computer user identifier to the employee. The synchronization of these data changes in computer network, telephone network, and organizational data across several databases may result in erroneous allocation of activity from a data device to an employee or other ownership entity. As a consequence, maintaining synchronization of ownership rights to various communication resources within an organization is difficult and problematic.

What is needed is a system and method for integrating data about data devices used on computer and telephone networks of an organization.

What is needed is a system and method for more efficient tracking and synchronization of ownership rights with respect to communication devices on both computer and telephone networks.

SUMMARY OF THE INVENTION

The limitations noted with respect to usage and tracking of data resource ownership has been overcome by a system and method made in accordance with the principles of the present invention. The system of the present invention includes a data extractor for extracting data resource communication activity data from a plurality of network activity data sources, a database of organizational data resource ownership data, and a communication activity report generator for correlating extracted data resource communication activity data and organizational data resource ownership data so that ownership of communication activity may be tracked.

The data extractor of the present invention obtains network activity data from a variety of data sources. The data sources include network communication devices such as firewalls, routers and servers and telephone communication devices such as a PBX or other telephone connection router/manager. Network activity data about communication activity may be obtained directly from the data resources initiating the communication activity or from data sources that handle communication activity initiated by a data resource. Methods for obtaining network activity data include interrogation of an application programming interface (API), capture of an output file for a data log generated by the communication device, or reception of a data stream provided by the communication device to some output port on the device. The network activity data are then processed to extract data resource communication activity data. Data resource communication activity data includes communication activity identification data and data resource identification data. This data are preferably stored in a database for later correlation with data resource ownership data although the extraction and correlation may be performed without intermediate storage of the data resource communication activity data.

Preferably, the data extractor has two modes of operation, namely, a test mode and an operational mode. In test mode, the data extractor does not store data resource communication activity data but rather displays the extracted data. This mode permits a system administrator to view the extracted data for a new data source and define a data source template that may later be used to extract data from the network activity data and generate the data resource communication activity data. Once a system administrator confirms the definition of the data source template for a data source, the data extractor may be placed in its operational mode for extracting data from data sources for which data templates have been defined.

Organizational data resource ownership data includes data for identifying the data resources from which communication activity data are extracted and the organizational entities owning the data resources. Typically, these organizational entities include company data, division data, department data, and employee data. This data may then be linked to identify an employee as being associated with a particular department and division within a company. These entities for an organization are merely exemplary and other components of organizational structure may be used. This data contain sufficient information to identify every data resource within an organization and the person associated with operation and utilization of that resource. In a preferred embodiment of the present invention, the relationship between corporate entities and data resources are implemented with join tables in a relational database, although other types of data repositories and data linking may be used.

The communication activity report generator may be used to generate a response to a directory query, a history query or both. A response to a directory query identifies one or more data resources and the ownership data linked to that device. A response to a history query identifies for a particular time period, one or more data resources, the network activity initiated by those data resources and ownership data linked to those data resources. To facilitate generation of query responses, the organizational data resource ownership data includes history data that identifies time periods during which an owner is associated with either a data resource or a particular organizational structure. That is, the history data may identify the transfer of an owner within the organization or the reassignment, additional assignment, or deletion of assignment of data resources to a particular owner. This history data need only be updated when an owner is reassigned within an organization or data resources are added, deleted or reassigned within the organization.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

FIG. 3A is a depiction of exemplary data output by a PBX data source;

FIG. 3B is exemplary output of a proxy server data source;

FIG. 3C is a depiction of exemplary data records output by a different version of the proxy server shown in FIG. 3B;

FIG. 4 shows data resource communication activity data extracted from two different data resources;

FIG. 7 shows exemplary table structures for corporate entity information;

FIG. 8 shows exemplary data structure for join tables used to identify data resource ownership data;

FIG. 12 shows exemplary data structure of history data in the database of the present invention;

DETAILED DESCRIPTION OF THE INVENTION

Figure 1:
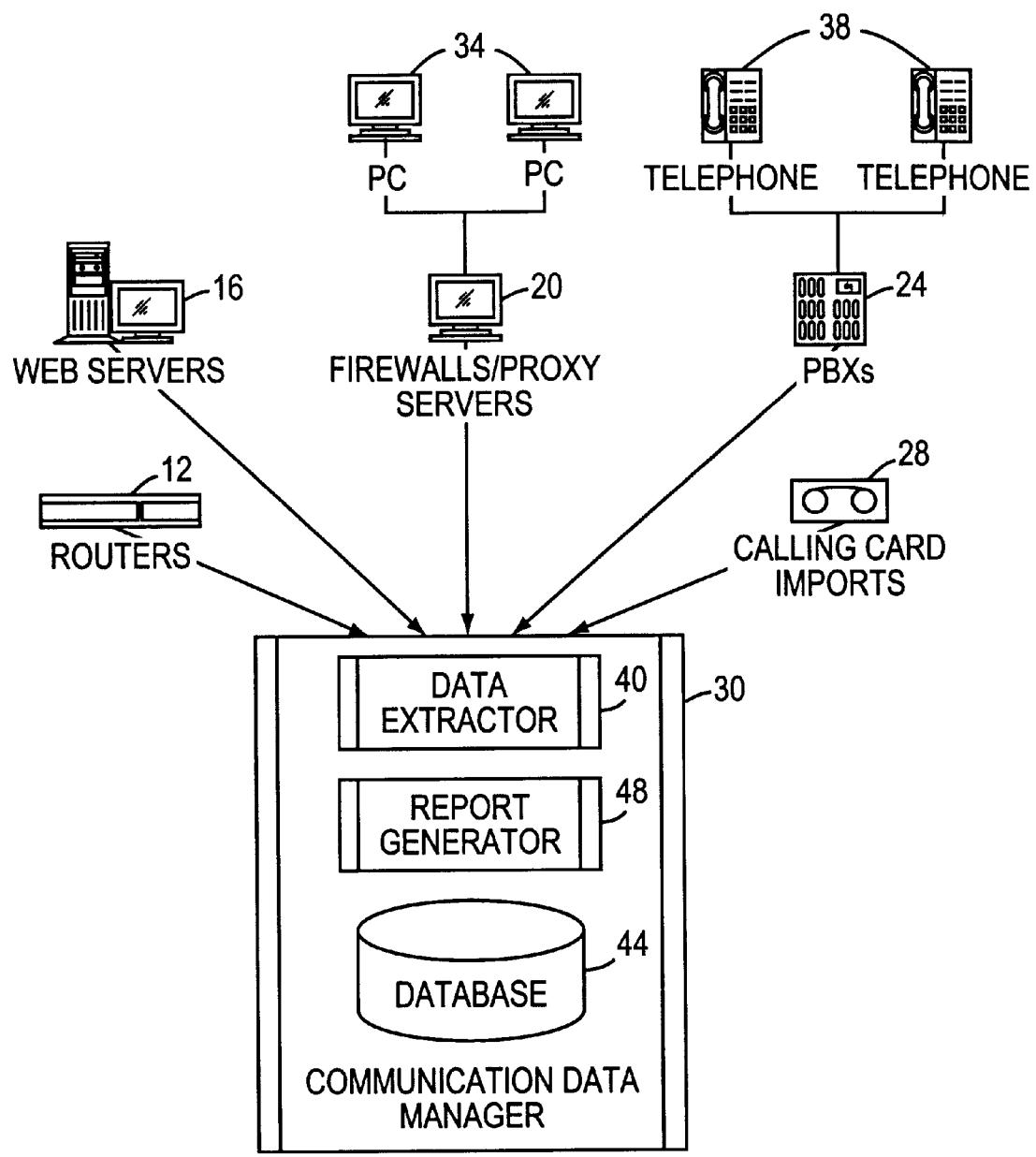
FIG. 1 is a depiction of the system of the present invention and exemplary data sources that may communicate with the system.

A system and method operating in accordance with the principles of the present invention are shown in the network depicted in FIG. 1. Data sources such as routers 12, web servers 16, firewall/proxy servers 20, PBXs 24, and calling card imports 28 are coupled to communication data manager 30. As shown in FIG. 1, data resources such as PCs 34 and telephones 38 are coupled through data sources 20 and 24, respectively, to manager 30. PCs 34 are shown coupled together in a computer network and telephones 38 are shown coupled together in a telephone network. Manager 30 includes data extractor 40, database 44, and communication activity report generator 48. As may be seen from FIG. 1, data sources 12, 16, 20, 24, and 28 may be directly coupled to manager 30 or they may be coupled together through a computer communication network such as a LAN or WAN. In either arrangement, network activity data for the telephone network and the computer network may be provided to manager 30 for processing.

Manager 30 is preferably implemented as a computer program that may be executed on one or more computers. Preferably, the program is written in the C programming language and modules of the program are provided as components in a dynamic link library for execution on a computer. The computer that executes a program implementing manager 30 preferably operates under a Microsoft Windows NT 4.0 (Service Pack 4 or 5), Windows 95, or Windows 98 operating system and includes at least a Pentium 200 MHz processor and 128 MB of RAM. The video display is preferably of SVGA quality with a resolution of 800×600 pixels. The hard drive capacity is a function of the data sources coupled to the computer and preferably includes at least 130 MB of storage space plus an amount equal to one-half of the largest file to be received from a data source plus at least 1 K of space for each voice data record to be received from a data source during data retrieval.

The following definitions are useful in understanding the detailed description and are set out below to facilitate the reader's understanding of the description, but not to limit the meaning of the disclosed terms to the definitions set forth below.

Terms

Data Source

A data source is a top level entity such as a PBX, firewall, proxy server, or router that is a source of network activity data regarding call/voice or internet/network activity.

Data Resource

A data resource is a device that initiates call/voice or internet/network activity. Extensions, DISAs, calling card account numbers (or virtual extensions), network internet protocols (IPs), and User IDs are examples of such devices. If a data resource provides call/voice or Internet/network activity data from the activity it initiates then the data resource may also be considered a data source.

Network Activity

Network activity data is data regarding call/voice or internet/network activity managed by a data source. Such data are typically logged to a log file as network activity data. Each data resource session or event managed by a data source generates activity that the data source may export to a log file as network activity. Network activity transmitted to the log file contains data elements that identify the data resource that initiated the network activity. Primary call/voice network activity data include extension, trunk, access code, direction, session date/time, duration, and number dialed. Internet/network activity data include IP/User ID, protocol, direction, session date/time, volume, and originating/destination URL. Primary call/voice activity data and internet/network activity are collectively called network activity data herein.

Company

Company is the top level entity in an organization.

Division

A division is a second level entity in an organization.

Department

A department is a third level entity in an organization.

Owner

An owner is a fourth level entity in an organization, which represents people or miscellaneous entities that use data resources. While an owner is preferably an employee, it may be any organizational entity to which a data resource may be assigned.

Figure 2:
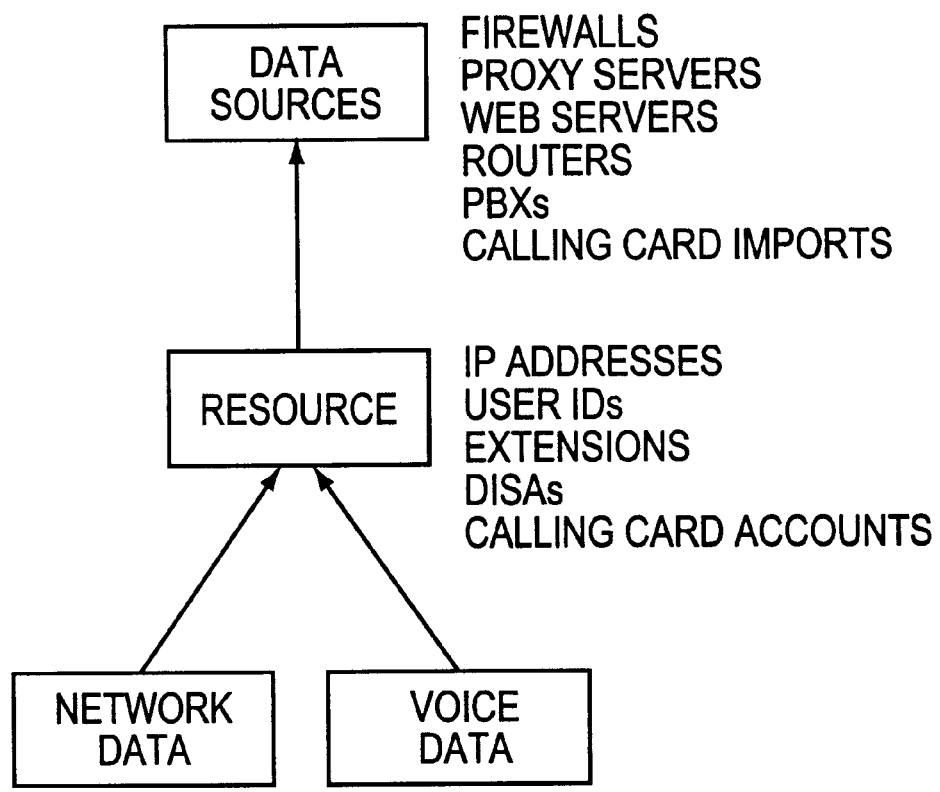
FIG. 2 is a block diagram showing the relationship between data sources, data resources and network activity data for both network and voice data.

FIG. 2 shows the relationship between a data resource and a data source. As shown in that figure, data resources may use an identifier such as an IP address, a user identification number, a telephone extension, a calling card account number, or direct inward system access (DISA). These data resources generate network activity such as telephone calls, file transfer operations or queries for files. Network activity is typically managed by a data source such as a firewall, proxy server, web server, router, PBX or calling card import. These data sources generate network activity data that identify the data resource that initiated network activity handled by the data source and the initiated network activity. This network activity data are typically provided by a data source to a log file. The log file may be stored in the data source, provided through an API to another application program for processing or storage purposes, or transmitted through a hardware port on the data source, such as the serial data port of a PBX. Data extractor 40 of manager 30 includes the requisite hardware and/or software interfaces to communicate with these various APIs, hardware ports, or log file structures to receive data log records from data sources. As explained in more detail below, data source templates are used to identify data fields in log data generated by data sources and data resource templates are used to identify network activity data in log data. While log data are preferably obtained from data sources, some data resources may generate log data for network activity initiated from the data resource. In this scenario, data resources and data sources are the same.

FIGS. 3A, 3B, and 3C depict various formats for different data sources and versions of data sources. For example, FIG. 3A shows call detail records generated by a particular type of PBX while the log data records as shown in FIGS. 3B and 3C are generated by two different versions of a proxy server made by the same manufacturer. Thus, FIGS. 3A, 3B, and 3C demonstrate the different formats for log data generated by different data sources and FIGS. 3B and C, in particular, show that different versions of the same manufacturer's data sources also provide data in different formats.

In order to accommodate the numerous formats of network activity data generated by various data sources, manager 30 includes data extractor 40. Data extractor 40 receives network data from data sources and extracts data from the network data for generation of data resource communication activity data. Additionally, data extractor 40 preferably performs costing computations on the communication activity data and merges the cost data and communication activity data into database 44.

Data extractor 40 is preferably comprised of five processing modules, namely, a control processing module, a reformatting module, a costing module, a merging module, and an alarm module. These modules are preferably implemented in program files in a dynamic link library (DLL). The functionality of these modules may briefly be described as:

Control DLL

This module controls the management of the input and output queues for the four other modules of data extractor 40. A control thread starts by retrieving communication activity data for a data source to be processed. Then it initiates the DLLs for the other modules of data extractor 40. As network activity data are provided to the reformat module, the output queue of the modules of data extractor 40 are monitored to facilitate the continuous flow of data between modules.

Reformat DLL

This module contains the code used by the reformatting engine. It uses data source templates to extract data resource communication activity data from network activity data. The extracted communication activity data may then be processed by the costing engine and alarm engines. This extraction is required because data sources generate network activity data in formats that are manufacturer and model specific. Data source templates allow the reformatting engine to map data from network activity data generated by different data sources to a standard format that may be processed by the costing and alarm engines. Though the control thread usually handles how to pass on the data, the reformatting engine generates special detailed output during test mode, and this test mode output is written to a text file for later viewing. A system administrator may view the text file to modify or create data source templates. Detailed output may also be generated when errors are found in the network activity data. FIG. 4 depicts such exemplary output records for communication activity data.

Cost DLL

This module contains the code used by the costing engine. This engine allocates a cost for network activity identified by data resource communication activity data. It implements costing methods set up for a data source to determine the correct origination, destination, and cost of the activity identified by the data. The cost data generated by this module is incorporated in the special detailed output records during operation of extractor 40 in test mode so data source templates may be configured to contain costing data.

Merge DLL

This module contains the code used by the merging engine. Because this operation is time intensive, this module preferably does little other than merging records into the database. Its main operation is to enforce rules to protect the referential integrity of the activity data once stored in database 44. These rules are discussed in more detail below.

Alarm DLL

This module contains the code used by the alarm engine that compares data resource communication activity data to thresholds. For example, telephone calls to exotic locations or calls that exceed some time duration may cause the alarm engine to generate an electronic page or email message to alert a system administrator of communication activity that may constitute abuse. Alarm records may be generated and stored in database 44 if the thresholds are exceeded.

Figure 5:
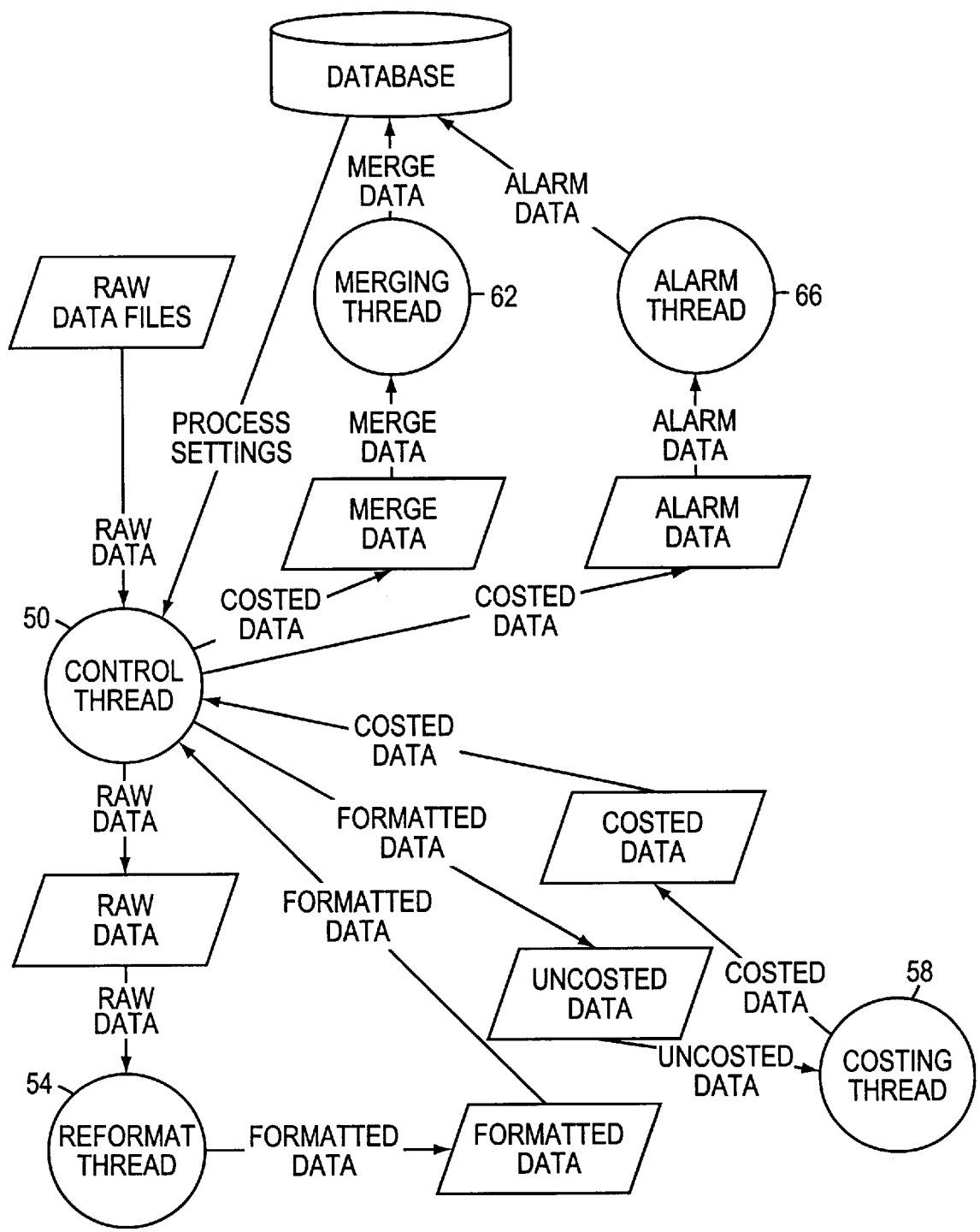
FIG. 5 is a data flow process diagram of the data extractor shown in FIG. 1.

The flow of processing through these five modules of data extractor 40 is depicted in FIG. 5. The processing of the reformat, costing, merging, and alarm modules is managed by the control module. As shown in the Fig., control module 50 retrieves network activity data from the log data received from various data sources and provides this data to reformatting module 54. Reformatting module 54 extracts communication activity data from the network activity data. The communication activity data are then provided by control module 50 to costing module 58. Costing module 58 determines the correct origination, destination, and cost of the activity. The cost data are then incorporated in the communication activity data. Merging module 62 then enforces the rules to protect the referential integrity of the communication activity data and preferably stores the communication activity data in database 44. The cost data are also provided to alarm processing module 66 where the communication activity data are compared to threshold values to determine whether any alarm conditions exist. If alarm conditions are detected, messages regarding the alarm condition may be generated and delivered. Also, alarm records may be generated for storage in database 44.

Preferably, reformatting module 54 and costing module 58 may operate in a test mode to generate data records that are not stored in database 44 but rather displayed through report generator 48 to a user. In this manner, a user may verify that the data source templates used by reformat module 54 and costing module 58 extract all information required for processing by manager 30. When data extractor 40 is in its operational mode, costing module 58 and reformat module 44 both provide communication activity data for storage in database 44. The exemplary data shown in FIG. 4 does not show all data preferably stored by manager 30 in database 44. Other data extracted by reformat module 54 include incoming activity volume, outgoing activity volume, security statistics, and activity origination details. Once network data have been processed by data extractor 40 of manager 30, summary statistics may be generated before control module 50 terminates its processing.

Database Design

Preferably, database 44 is managed and structured to optimize the management and tracking function for the time-dependent relationships stored in database 44 and the reporting function for those relationships. Consequently, the database design is preferably divided into two parts, one part designed for data management and processing and the other part for data reporting. A directory interface is included as part of the GUI of report generator 48 to manage and process the time-dependent relationships between resources and their data sources while the reporting function uses a history table to maintain hierarchical data for relevant time periods for the generation of reports.

The directory interface preferably operates on a relational database and generates join tables between two adjoining data tables for organizational structural components to track relationships between owners and data resources over time. The organizational structural components are sometimes referred herein as entities. The hierarchical structure of entities associated with a data resource represents the owner of that resource. The reporting interface, on the other hand, generates a history table to include all levels of the organizational hierarchy and each row of the history table represents a snapshot of the hierarchy for a period of time. The reporting history table may also be generated from the organizational structural component records.

Data Source and Resource Association

As previously noted (FIG. 2) a static association exists between a data source (i.e., PBX, firewall, proxy server, etc.) and the communication resources (IPs, extensions, DISAs, etc.) managed by it. The activity generated by the resources also has the same static association with the data source through which the activity is managed.

Resource and Owner Association

Database 44 is able to track the association between a data resource and its owner. As noted above, an owner is identified by a hierarchical relationship of organizational structural components. This hierarchical structure links any organizational entity or component to a resource of any type. This linkage enables manager 30 to manage time-dependent associations between any owner and any data resource as long as a link exists between the network activity data source and its owner.

Figure 6:
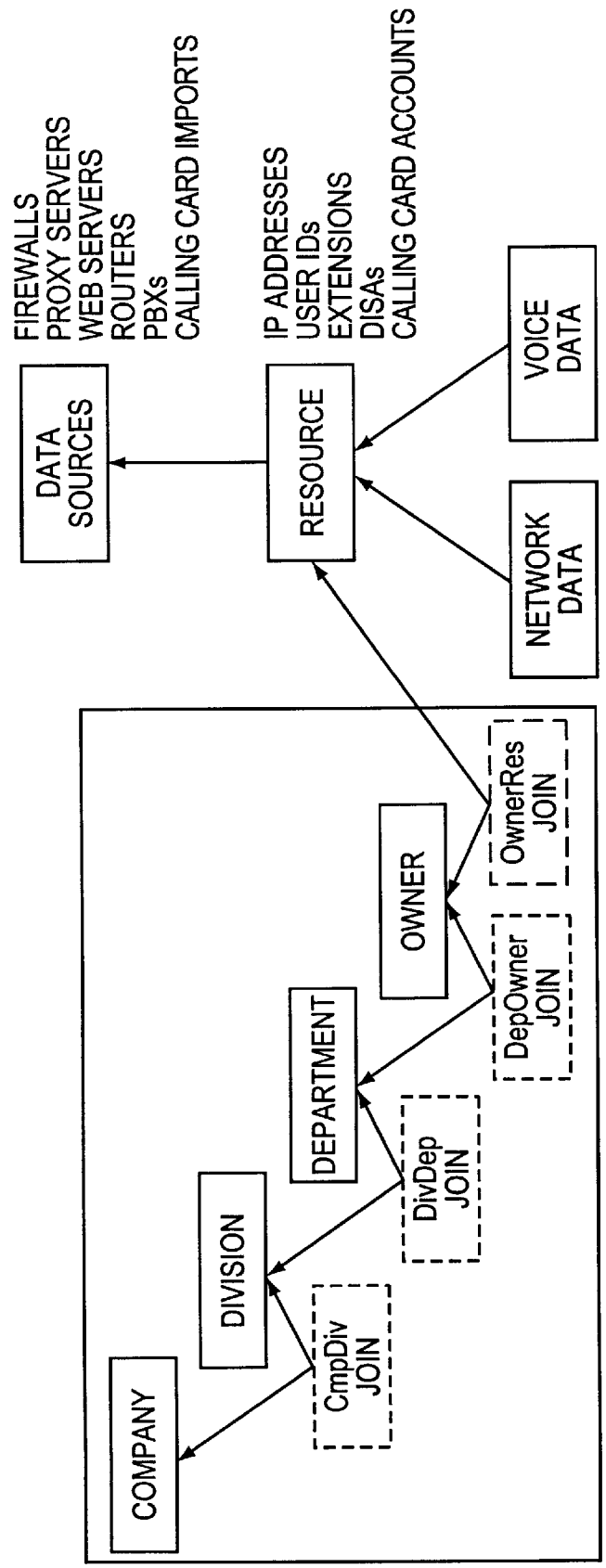
FIG. 6 shows the join table relationship of the preferred embodiment of the present invention used to identify data resource ownership data.

An owner and a data resource are preferably associated with a join table. Join tables link a child entity to one or many parent entities. FIG. 6 illustrates how table joins may be used to identify a hierarchical relationship between a data resource and its owner. Each contains a reference or identifier of a parent in the parent table and an identifier to the child in the child table. In addition to the parent and child identifiers, association start and end date (termination date) stamps are generated. The management of the start and end dates provides a time-dependent association between each child and its parent. Tracking the relationships between organizational structural components and data resources is supported with a history table. FIG. 7 depicts exemplary join table structures for identifying hierarchical relationships between adjoining company organizational components.

The exemplary data shown in the join tables of FIG. 8 demonstrate how join tables may be used to track hierarchical data for a data resource in the following scenario. For this scenario, IP resource address 206.241.52.32 and telephone extension resource number 3897 are used. In this scenario, these data resources are owned by Richard Moon who joined the Sales Department on 01/02/1993. On 09/15/1995 Richard Moon was transferred from the Sales Department to the Marketing Department. Using join tables as shown in FIG. 8, manager 30 is able to track the employee's ownership of those two data resources for the time period of 01/02/1993 through 09/15/1995. The OPEN status shown in FIG. 8 indicates the association is active. In addition, if Richard Moon was unable to retain ownership of extension 3897 during the transfer but was assigned telephone extension resource 4780, his ownership of extension 3897 would show termination on 09/14/1995 and his ownership of extension resource 4780 would start on 09/15/1995.

Database Logic for Managing Resources

Management of data resources during processing of network activity and processing initiated through the GUI of report generator 48 requires manager 30 to enforce rules for the referential integrity of database 44. Implementation of the rules presented below during network activity data processing and GUI initiated processing allows users of manager 30 to modify the hierarchical structure and resources assignments with an effective date that may be past or future. Effective date is the start date that a child is assigned to a parent. Rules listed below describe how historical data about relations between hierarchical entities, such as, Company, Division, Department, Owner and Resources are managed.

Rule 1

No Child is permitted to be orphaned; it must always exist in a valid Child/Parent relationship, even if the Parent is the !Unassigned instance. The exception to this, of course, is the Company entity, assumed to be the highest level of the tree, and hence has no Parent.

Rule 2

Entities may be generated by a user through the GUI of report generator 48 by network activity data processing or by importing data to manager 30. Manager 30 generates new data resources only when processing telephone activity or importing data from other versions of manager 30 or firewall databases.

Rule 3

Every entity is assigned to some parent on any date between Global Start and Global End. Global Start and Global End dates define the beginning and end of a time line for manager 30. If a parent is not provided, manager 30 uses the !Unassigned parent by default except for data resources. Network activity processing generates default owners for each new data resource. These owners are assigned to the !Unassigned Department and the resource is assigned to the owner with a Default Effective Date=Global Start, End= Global End.

Rule 4

Resources may be transferred to other owners including overhead accounts. Effective date of the transfer may be between Global Start and Global End.

Rule 5

Preferably, the lowest level of granularity for a transfer is one day, although other units of time may be enforced.

Rule 6

Transfer does not overwrite any transfers that happened after the transfer effective date, but if there was a transfer of the same child on the same day it may be overwritten.

Rule 7

Transfer of any entity does not affect its relationship with its children or the relationships of the transfer target with its parent.

Rule 8

Entities other than Resources may be terminated. Resources may be unassigned from an owner.

Rule 9

If a Resource is unassigned it is moved to the Unassigned bin and assigned to its default owner under !Unassigned department. Unassignment does not affect transfers with an effective date after the unassignment effective date. Unassignment may be undone.

Rule 10

Termination may be undone. Termination of an entity does not change the link between that entity and its children. Links with children remain unchanged. A user may explicitly request transfer of children of an entity being terminated to other parent(s) before or after the termination effective date.

Rule 11

If an entity other than a Resource has never had children (there is no transfer record to this object in the database) it may be destroyed (removed from the database).

Example:

An employee of the Marketing department, Richard Moon, assigned extension 3780 was fired on January 15. The system administrator terminated the assignment of the extension to the Marketing department with an effective date of January 15. On January 20, extension 3780 was transferred to another employee, Bob Smith. Bob was in the Support Department before January 25. On January 25 Bob was transferred to the Marketing Department.

All communications made from extension 3780 appear in the Directory GUI and Reports under before Jan 15 Marketing Department, Richard Moon from Jan 15 to Jan 19 Unassigned Department, Richard Moon (if processing encounters communications)

from Jan 20 to Jan 24 Support Department, Bob Smith on or after Jan 25 Marketing Department, Bob Smith All communications made from extension 3780 before January 20 appear in the directory interface GUI and generated reports as being assigned to Richard Moon (even after Richards' termination on January 15, if processing encounters communications). All communications made from extension 3780 on or after January 20 appear in the directory interface GUI and generated reports as being assigned to new owner, Bob Smith.

The rules discussed above are also used to implement operations performed by manager 30. A distinction is made between operations that affect the existence of an entity, and operations that affect the relationship between two entities. Operations that affect the existence of an entity either generate or destroy rows in the appropriate Company, Division, Department, Owner, or Resource table. Operations that affect the relationship between two entities either insert, update, or delete rows in the join tables between two entities, which would be the appropriate CompanyDivision, DivisionDepartment, DepartmentOwner, or OwnerResource join table. Preferably, manager 30 implements the following operations:

Operation—Transfer

1. If effective date is not specified set effective date to Current Date
2. Limitation rule for Effective date: Effective date may not be less than Global Start Date. Preferably, the Global Start Date is 01/01/1980 and the Global End Date is 12/31/2089.
3. Limitation rule for the undoing of Transfer operations (deleting transfer records) performed in the past: at least one transfer must stay in the system (otherwise the object becomes orphan). This does not mean that an object may not be deleted/destroyed (see deletion section below).

Operation—Termination

Terminations are implemented as transfers to an Unassigned parent. Display of content of the Unassigned grouping in a Directory may be enabled or disabled. This gives the user the ability to hide terminated objects from view through the directory interface GUI of report generator 48, keep historical data, have access to terminated objects in the past before they were terminated, or undo termination and restore an object.

Operation—Deletion

Company, Division, Department, or Owner may be deleted if there is no join record that points to it at any time. Optionally, Company, Division, or Department may be deleted with children if no data resource points to any of the children as owners at any time. This way communications data are not lost.

Operation—Transfer Management

Figure 9:
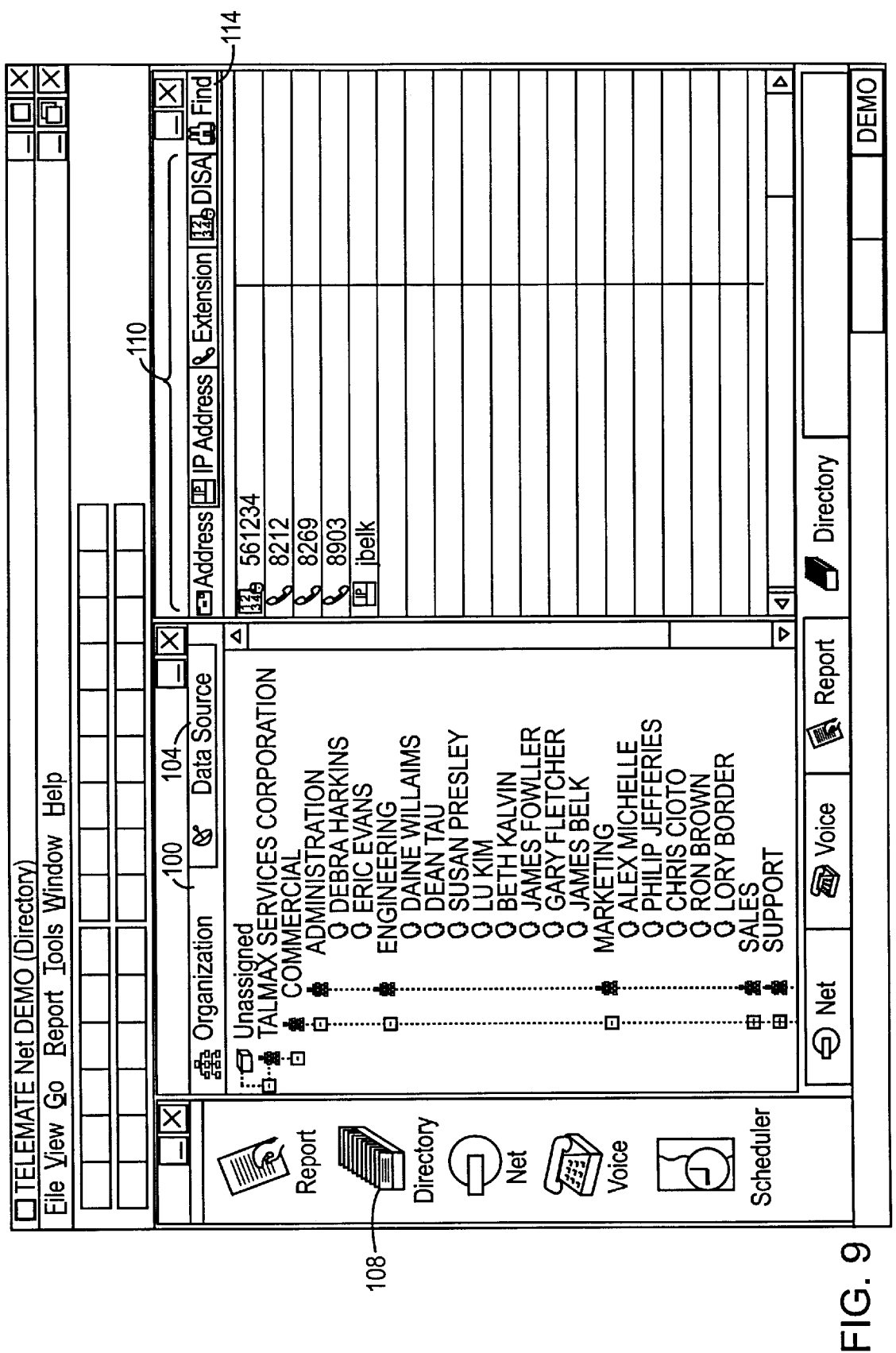
FIG. 9 shows an exemplary graphical user interface (GUI) for a directory interface to the report generator shown in FIG. 1.

Transfer ID_Child to ID_Parent on EffDate
    If no transfer of the ID_Child exists // this should happen on creation only create one: from EffDate to GlobalEnd belongs to ID_Parent
    if EffDate<GlobalStart create one more: from GlobalStart to EffDate belongs to !Unassigned
    Else
    if there is transfer of the same child on the same day and parent !=ID_Parent modify parent to ID_Parent and save
    else // insert transfer
    // there should be a record active on EffDate—the system needs to split it
    // if it does not exist it should be inserted
    select newEndDate=EndDate
    ID_TransToSplit=ID of transfer of the same child with StartDate<EffDate and
    EndDate>=EffDate
    insert transfer (ID_Child, ID_Parent, EffDate, newEndDate)
    update transfer set EndDate=EffDate —1 day where ID=ID-TransToSplit Operation—Delete Transfer If there is previous transfer with EndDate=this transfer's StartDate —1 day update previous transfer set EndDate=this transfer's EndDate delete this transfer
    else
      error
    //This prevents the manager from deleting the very first transfer Operation—Chance Transfer Date to Effective Date If there is another transfer of the same child on the same day
      error
    else
    if there is previous transfer with EndDate=this transfer's StartDate —1 day
    if EffDate1>previous transfer StartDate and EffDate1<= this transfer EndDate
      update previous transfer set EndDate=EffDate1 —1 day
      update this transfer set StartDate=EffDate1
    else
    // if this is not allowed
      error
    // if this means child really was transferred on the EffDate1
    Delete this Transfer // apply DeleteTransfer Rule
    InsertTransfer ID_Child, ID_Parent, EffDate1
    else
      error Integrated Data Source Management Directory Interface A preferred implementation of the directory interface of the report generator 48 is depicted in FIG. 9. The organizational and data views 100 and 104 available through directory 108 render the integration of different data source types visible. In these views, the associations of extensions and authenticated IP addresses to an owner may be displayed. Directory 108 also includes controls for altering the time window for the display of an historical association. Resource types 110 may also be displayed and the FIND function 114 supports quick access to specific criteria that a user may define. These defined criteria may be used to locate information and to set an effective date for the Directory. In this manner, managing and tracking of time dependent associations are simplified. Management of these assignments is simplified using a single GUI that also increases the productivity of system administrator.

Reporting Interface

Figure 10:
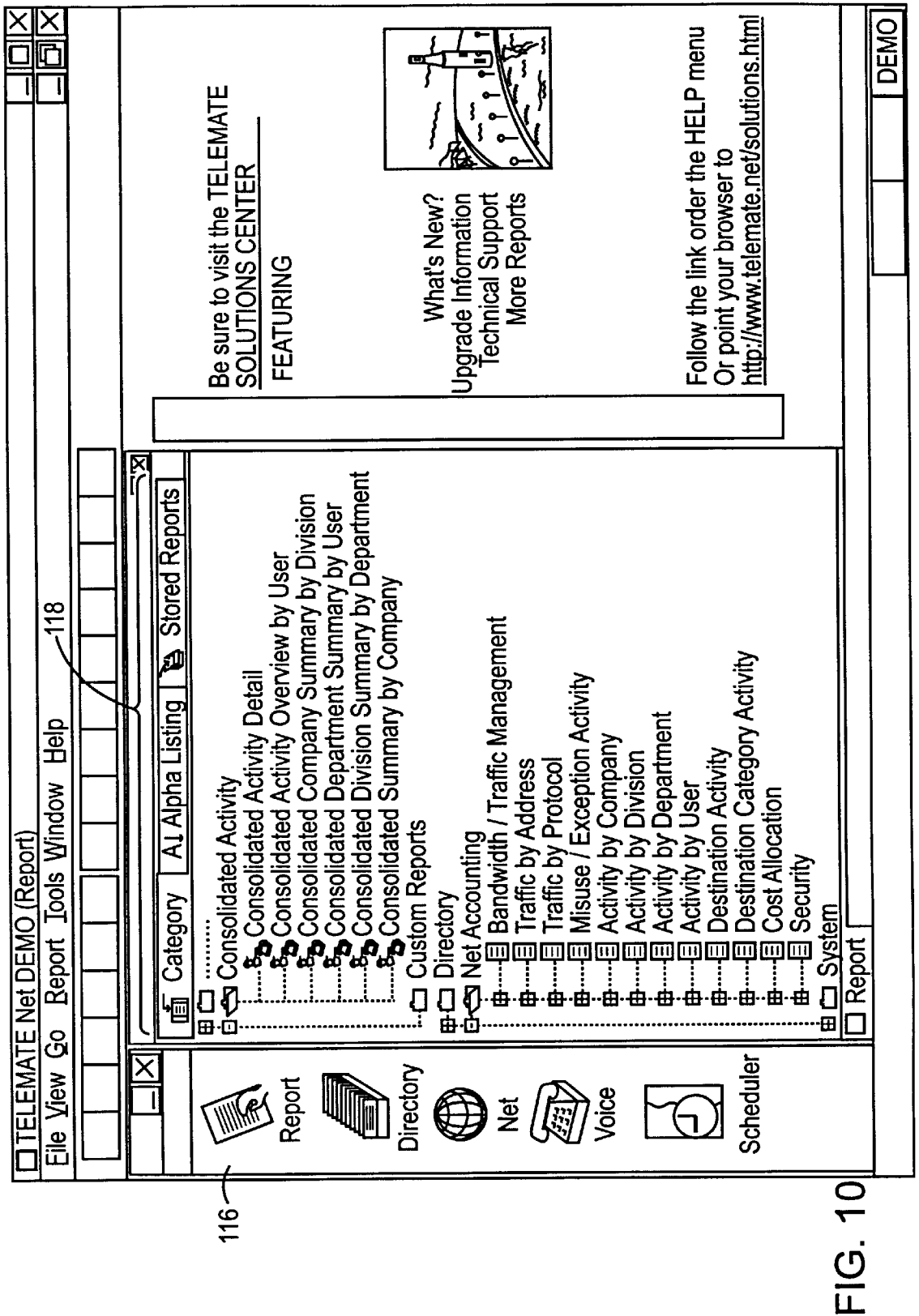
FIG. 10 shows an exemplary GUI for a reporting interface of the report generator shown in FIG. 1.

A preferred implementation of reporting interface 116 of report generator 48 is depicted in FIG. 10. Categories 118 are designed to consolidate voice and network activity while still providing for individual data source reporting, if necessary. Interface 116 uses a history table because the preferred structure of database 44 discussed above for managing and tracking time-dependent relationships is not optimal for reporting against those relationships. A history table includes all levels of a hierarchical relationship and each row of this table represents a snapshot of the hierarchy for a period of time. Management of these assignments is simplified using a single GUI that also increases the productivity of system administrator.

History

Figure 11:
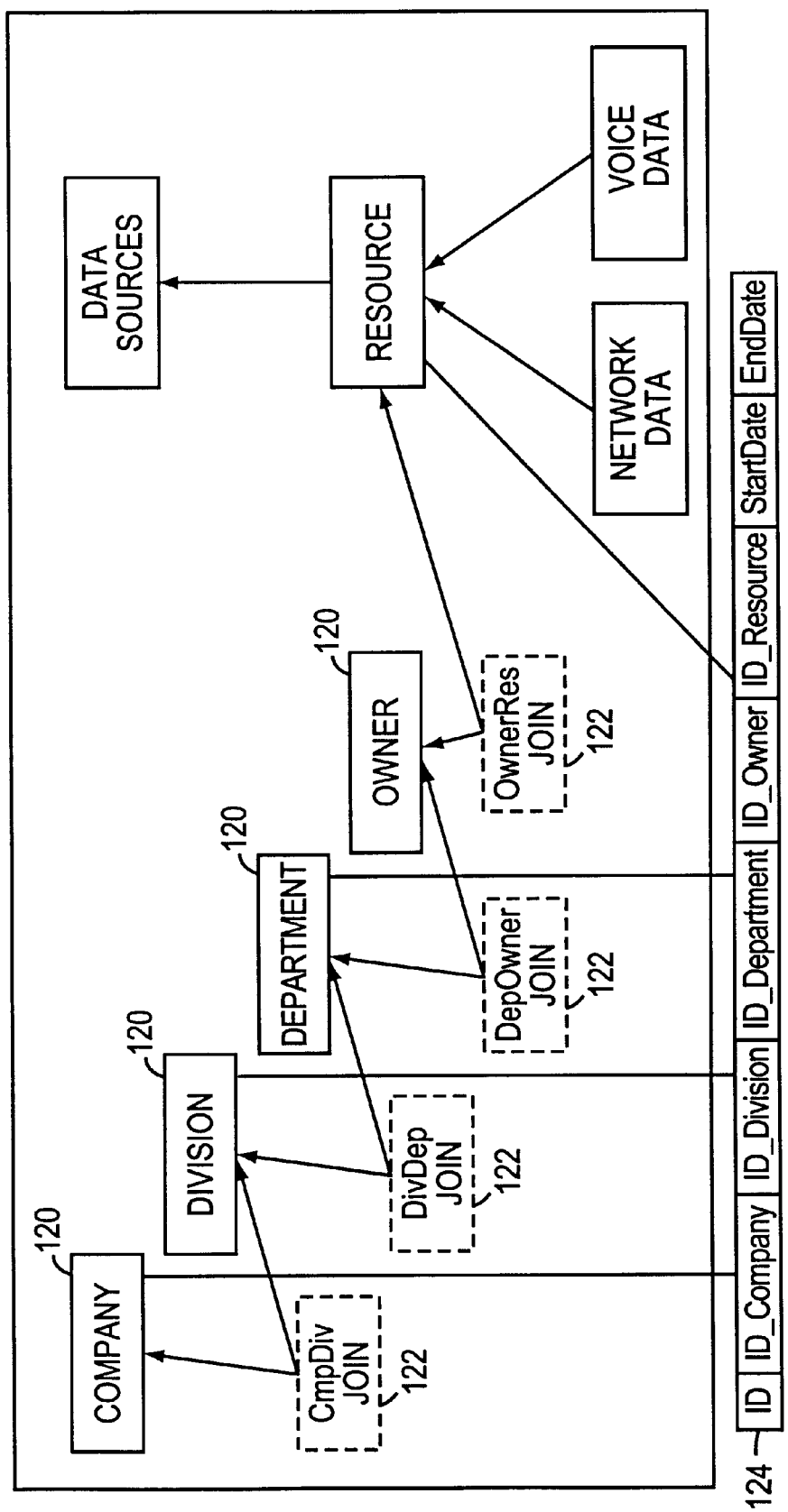
FIG. 11 depicts in schematic form the relationship between organizational component data tables, the associated join tables, and a row of a history table.

Using a history table, reporting interface 116 may quickly access historical information a on any single data source or on multiple data sources of different data source types. The history table is only used by reporting interface 116 and is not maintained directly by operations on the organizational structure. Operations affecting organizational structure may come from directory interface 108, from processing network activity data, and from imports. Because the history table is not kept current, this table needs to be completely rebuilt after any rule operation noted above occurs on the schema (changes that affect Company, Division, Department, Owner, or Resource). FIG. 11 depicts the relationship between organizational component data tables 120, the associated join tables 122, and a row 124 of a history table as preferably implemented. An exemplary segment of history table reflecting the Richard Moon scenario discussed above is shown in FIG. 12.

Preferably, a stored procedure that rebuilds the history table includes a database cursor. An SQL Query that feeds the cursor produces a join of all valid rows between CompanyDivision, DivisionDepartment, DepartmentOwner, and OwnerResource join tables. The cursor logic loops through each of these rows, and determines the MAX of the start dates and the MIN of the end dates. This determination defines the time segment for which a row is a snapshot of the complete organization structure, was valid. This information is then inserted, row by row, into the new History table. The new History table is built under the name "HistoryNew", and when the new table is constructed, the current "History" table is renamed "HistoryOld", and "HistoryNew" is renamed "History".

The system preferably uses a "History Dirty" flag as a signal to the reporting interface that the history table needs to be rebuilt. Any process that changes the organizational structure needs to set this flag, but preferably does not reconstruct the history table. When the reporting interface executes, the flag is checked, and if true, the stored procedure to rebuild the table is executed. While the stored procedure for history table rebuilding is executing, all other reporting interface processes are suspended (blocked in a wait state) until the table is rebuilt. After the table is reconstructed, the flag is set to false, and all other reporting interface processes are unblocked. Since reporting interface processes may run from several machines at the same time, the blocking mechanism is preferably done in the database.

Reporting Process Flows

To facilitate the generation of reports and to more efficiently distribute reports to recipients, the system and method of the present invention enables a user to define and store a report template that may be used later. Users may also limit the result set obtained by a report template by using filters on individual data source elements. These filters enable reports to drill down into the details and summary statistic on all data contained in database 44.

Figure 13:
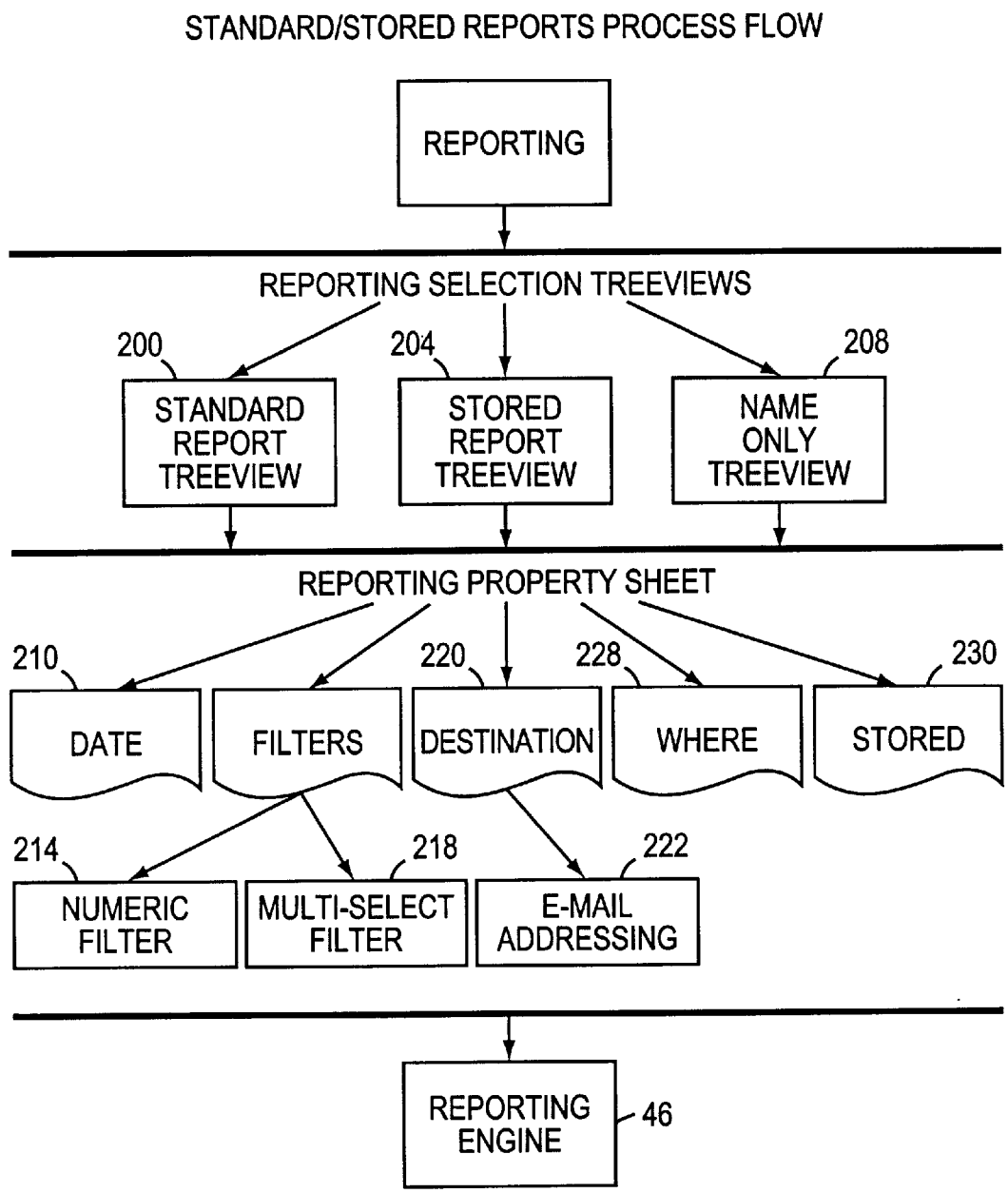
FIG. 13 is a process flow diagram of the process for generating a standard report by system of the present invention.

A process for generating reports is shown in FIG. 13. That process begins by determining whether the user wants to use a predefined system report template (block 200), a user report template that has been previously stored (block 204), or a category template (block 208). After a report template is selected, a report object is generated using the selected template. A report object is a container class that is used as an interface between reporting interface 116 and report engine of communication activity report generator 48. Filters for the report object may then be selected. These filters include a date filter (block 210), a numeric filter (block 214) or multiple selection criteria filter (block 218). Data defining the destination for the report and its format are then incorporated within the report object (block 220). Format options for reports include Microsoft Word, Excel, HTML while destinations may include a display for a report preview, a disk file, printer, or an email address. If the recipient is to receive the report via email then destination information and data regarding the email transfer are also incorporated in the object (block 222). Data for configuring the contents of the report including unique headings and currency formats may also be incorporated within the report object (blocks 228, 230). Once the report object is completely generated, it is passed to report engine 46 of communication activity report generator 48 for execution.

Figure 14:
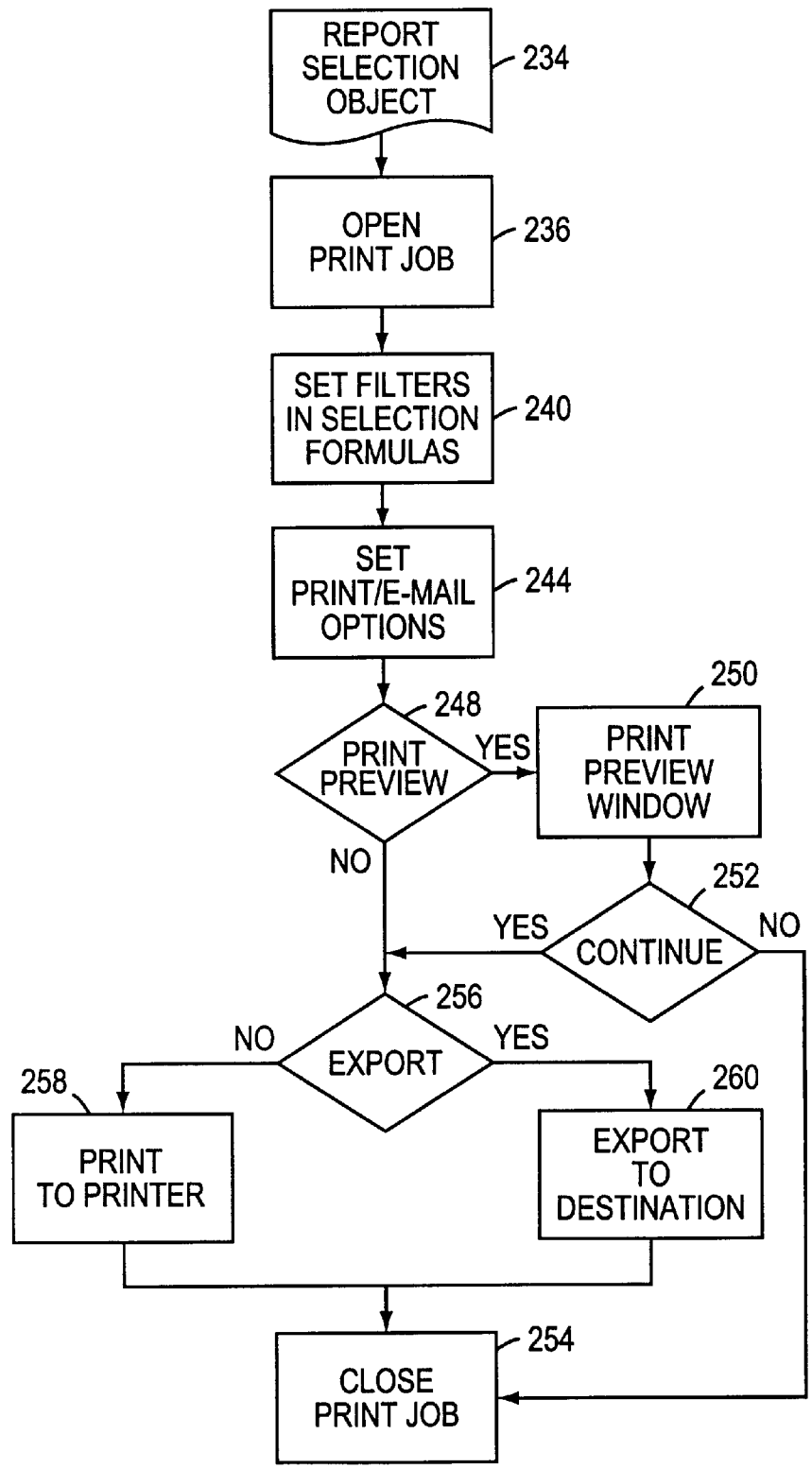
FIG. 14 is a process flow diagram of the reporting engine process flow for a single destination.

The process for executing a report object for a single destination is shown in FIG. 14. Once the report object is generated and provided to report engine 46 (block 234), a print job is opened and this processing initializes report engine 46 (block 236). Using the filter data in the report object, report engine 46 generates selection formulas (block 240). Preferably, selection filters are SQL statements or SQL stored procedures for querying database 44. The destination data of the report object are then used to direct the result set of the selection formula (block 244) and the selection formula are executed. Once the report set is obtained, the system determines whether the user has requested a preview of the report (block 248). If a preview was requested, a preview window of the report is generated and displayed for the user (block 250). If the user decides to terminate the report generation after viewing the preview (block 252), the print job is closed (block 254). If no preview is required or the report is to be sent following preview (block 256), the report is configured as required by the destination and format data within the report object depending upon whether the report is printed (block 258) or transmitted electronically (block 260). Once the report has been sent, the print job is closed (block 254).

Figure 15:
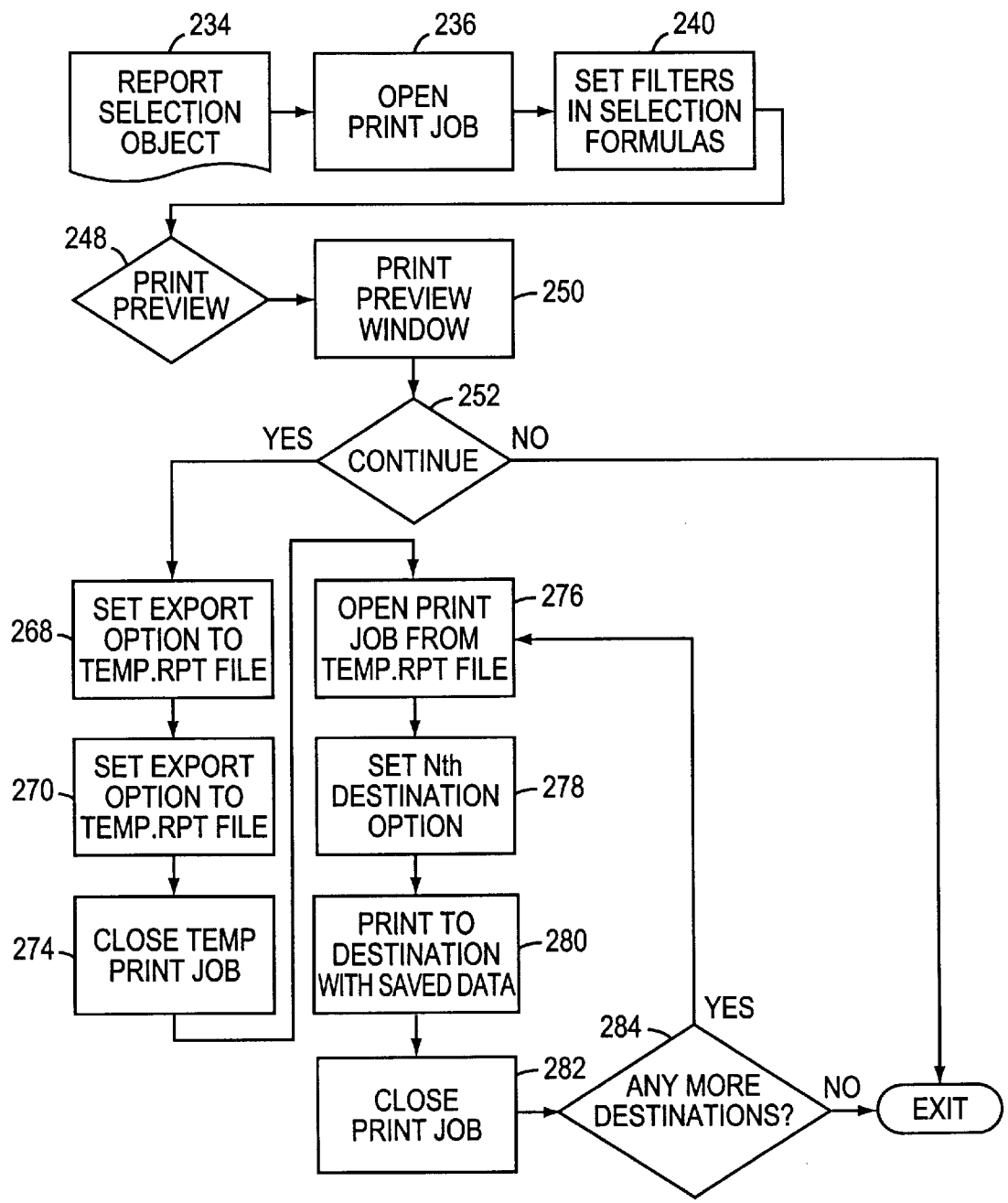
FIG. 15 is a process flow diagram for the process of the reporting engine for multiple destinations.

The process for generating and sending a report generated by a report object to multiple destinations is shown in FIG. 15. The process begins as described above with respect to FIG. 14 (blocks 234–252). To avoid executing the selection formula multiple times for multiple destinations, a temporary file is opened (block 268) and the report set obtained by operation of the selection formula on database 44 is directed to the temporary file (block 270). That file is then closed (block 274) and the exports of the report set are performed against this file. For each destination, the temporary file is opened (block 276), the report set is configured with reference to the destination data (block 278), and the report is then sent to the destination (block 280). The temporary file is then closed (block 282) and the process determines whether the report has been sent to all destinations defined in the report object (block 284) and if not, the process continues by processing the temporary file again (block 276). Otherwise, the process terminates.

Figure 16:
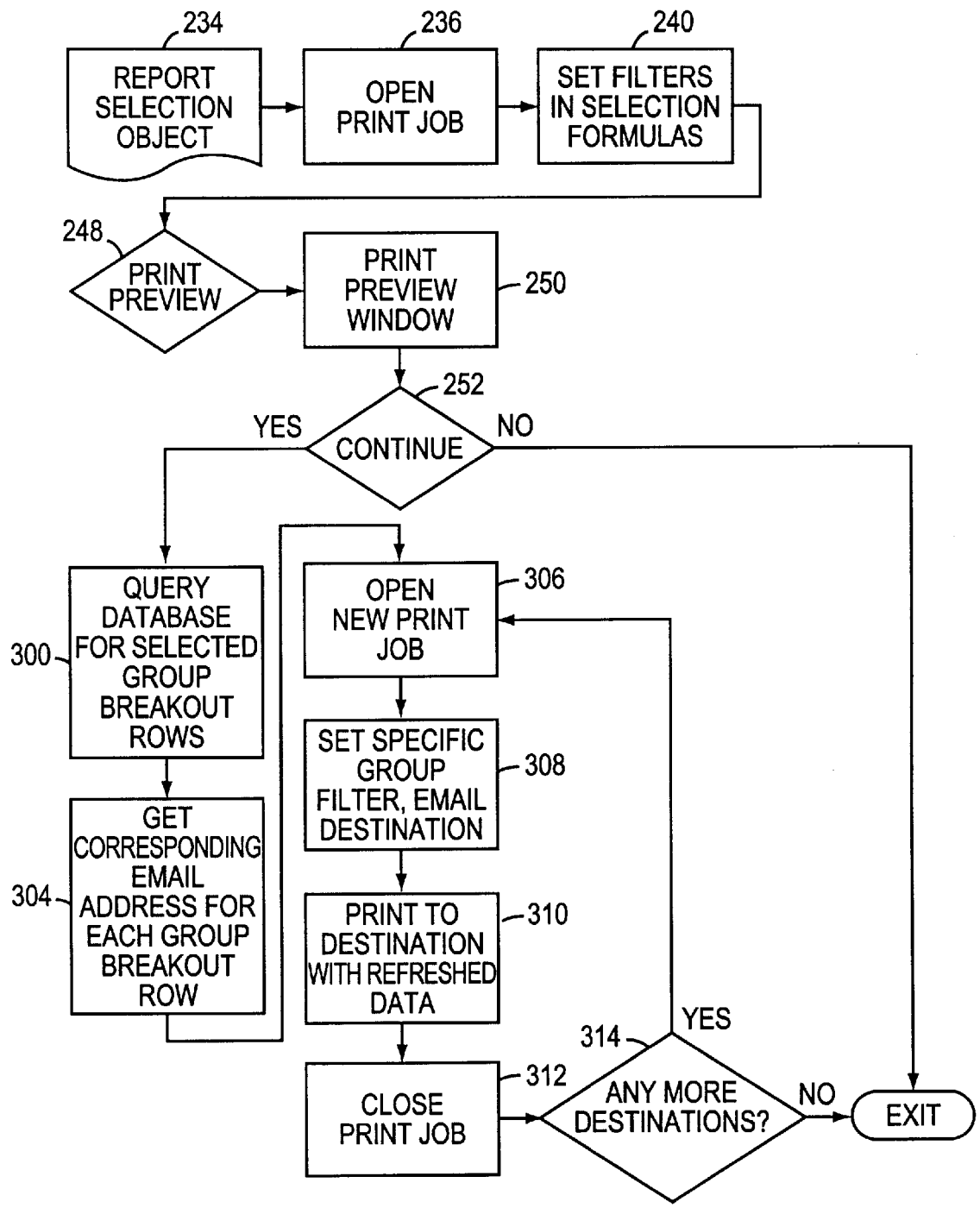
FIG. 16 is a process flow diagram for the reporting engine to identify an email breakout.

The process for generating a report, separating it into sections, and sending each section of the report to a different destination by email is shown in FIG. 16. The process begins as described above with respect to FIG. 14 (blocks 234–252). This occurs, for example, when a report is summarized by department and each department section of the report is to be sent to a representative in each department. Preferably, this type of automatic separation of a report is provided by pre-configuring a report template to separate the report in correspondence with the organizational level at which the report is to be summarized. To separate the report, the process queries the organizational level that corresponds to the report breakout level group (block 300). The email address for each section of the report is then determined (block 304). A print job is then opened for the a destination (block 306) and a filter applied to the report set to remove data that does not correspond to the destination (block 308). The filtered data set is then configured and sent to the corresponding address (block 310). The print job is then closed (block 312). If report sections for other destinations remain (block 314), a new print job is opened (block 306) and processing continues for that report section (blocks 306–312). Once all of the report sections have been sent, the process terminates.

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. The invention's broader aspects are therefore not limited to the specific details, represented apparatus and method, an illustrative example shown and described. Accordingly, departures may be made from such details without departing from the spirit or scope of applicant's general inventive concepts.

What is claimed is:

1. A system for tracking ownership of network activity of data resources comprising:
   a data extractor for extracting data resource communication activity data from a plurality of different kinds of network activity data sources including at least two of a router, web server, firewall/proxy server, private branch exchange (PBX), and calling card import, the data extractor including a reformatting module for converting network activity data into data resource communication activity data;

a database of organizational data resource ownership data; and a communication activity report generator for correlating extracted data resource communication activity data and organizational data resources ownership data so that ownership of communication activity may be tracked.

2. The system of claim 1, said data extractor further comprising:

a reformatting module for converting network activity data to data resource communication activity data.

3. The system of claim 2, said data extractor further comprising:

a costing module for computing costing data for data resource communication activity data; and a merging module for merging said costing data and said data resource communication activity data in a said database.

4. The system of claim 3, said data extractor further comprising:

an alarm module for comparing said data resource communication activity data to thresholds.

5. The system of claim 1, wherein said alarm module also generates alarm data in response to said data resource communication activity data exceeding said thresholds; and said merging module merges said alarm data into said database.

6. The system of claim 1, said database further comprising:

organizational data tables for containing organizational component data; and join tables for linking adjoining organizational data tables so that an owner of a data resource may be identified by said join tables.

7. The system of claim 6, said database further comprising:

a history table for containing ownership data for a data resource for a specified time period.

8. The system of claim 1, said communication activity data report generator further comprising:

a directory interface for providing a view of organizational data stored in said database; and a reporting interface for defining a report object to query said database.

9. The system of claim 8, wherein said merging module implements rules for maintaining referential integrity of said data resource communication activity data stored in said database.

10. A method for tracking ownership of the network activity of data resources comprising:

extracting data resource communication activity data from a plurality of different kinds of network activity data sources including at least two of a router, web server, firewall/proxy server, private branch exchange (PBX), and calling card import;

converting network activity data into data resource communication activity data;

storing organizational data resource ownership data; and correlating extracted data resource communication activity data and organization data resource ownership data so that ownership of communication activity may be tracked.

11. The method of claim 10, said extraction further comprising:

converting network activity data to data resource communication activity data.

12. The method of claim 11, said extraction further comprising:

computing costing data for data resource communication activity data; and merging said costing data and said data resource communication activity data in a database.

13. The method of claim 12, said extraction further comprising:

comparing said data resource communication activity data to thresholds.

14. The method of claim 12, said comparison further comprising:

generating alarm data in response to said data resource communication activity data exceeding said thresholds; and merging said alarm data into said database.

15. The method of claim 10, said storage further comprising:

storing organizational component data; and linking organizational component data to identify an owner of a data resource.

16. The method of claim 15, said storage further comprising:

storing data to identify ownership data for a data resource for a specified time period.

17. The method of claim 10, further comprising:

providing a view of organizational data stored in said database; and defining a report object to query said database.

18. The method of claim 17, further comprising:

maintaining referential integrity of said data resource communication activity data stored in said database.

19. A system as claimed in claim 1 wherein the data resource communication activity data includes session date/time and origination identifier data.

20. A method of claim 10 wherein the data resource communication activity data includes session date/time and origination identifier data.

21. A system for tracking ownership of network activity of data resources, the system comprising:

a data extractor for extracting data resource communication activity data from a plurality of different kinds of network activity data sources including at least two of a router, web server, firewall/proxy server, private branch exchange (PBX), and calling card import;

a database of organizational data resource ownership data; and a communication activity report generator for correlating extracted data resource communication activity data and organizational data resources ownership data so that ownership of communication activity may be tracked.

22. A method for tracking ownership of the network activity of data resources, the method comprising:

extracting data resource communication activity data from a plurality of different kinds of network activity data sources including at least two of a router, web server, firewall/proxy server, private branch exchange (PBX), and calling card import;

storing organizational data resource ownership data; and correlating extracted data resource communication activity data and organization data resource ownership data so that ownership of communication activity may be tracked.

\* \* \* \* \*